US010802887B2

(12) United States Patent
Altstaetter et al.

(10) Patent No.: US 10,802,887 B2
(45) Date of Patent: Oct. 13, 2020

(54) COMPUTE NODES WITHIN RECONFIGURABLE COMPUTING CLUSTERS

(71) Applicant: CALIENT TECHNOLOGIES, INC., Goleta, CA (US)

(72) Inventors: David Altstaetter, Goleta, CA (US); Jitender Miglani, Hollis, NH (US)

(73) Assignee: CALIENT TECHNOLOGIES, INC., Goleta, CA (US)

( * ) Notice: Subject to any disclaimer, the term of this patent is extended or adjusted under 35 U.S.C. 154(b) by 0 days.

(21) Appl. No.: 16/750,498

(22) Filed: Jan. 23, 2020

(65) Prior Publication Data

US 2020/0233718 A1 Jul. 23, 2020

Related U.S. Application Data

(63) Continuation of application No. 16/351,931, filed on Mar. 13, 2019, now Pat. No. 10,552,227, which is a continuation of application No. 15/798,920, filed on Oct. 31, 2017, now abandoned.

(51) Int. Cl.

| | |
|---|---|
| ***G06F 15/80*** | (2006.01) |
| ***H04B 10/25*** | (2013.01) |
| ***G06F 9/50*** | (2006.01) |
| ***H04L 12/46*** | (2006.01) |
| *G06F 15/76* | (2006.01) |
| *G06F 9/38* | (2018.01) |

(52) U.S. Cl.

CPC .......... *G06F 9/5061* (2013.01); *G06F 9/5077* (2013.01); *G06F 15/80* (2013.01); *H04B 10/2589* (2020.05); *H04L 12/4637* (2013.01); *G06F 9/38* (2013.01); *G06F 2015/768* (2013.01)

(58) Field of Classification Search

CPC .......................... G06F 9/5061; H04B 10/2589
See application file for complete search history.

(56) References Cited

U.S. PATENT DOCUMENTS

| | | | |
|---|---|---|---|
| 9,008,510 | B1 | 4/2015 | Zhao et al. |
| 9,207,404 | B2 | 12/2015 | Miglani et al. |
| 9,706,276 | B2 | 7/2017 | Rickman et al. |
| 10,552,227 | B2 | 2/2020 | Altstaetter et al. |
| 2010/0239266 | A1 | 9/2010 | Kash et al. |
| 2010/0254703 | A1 | 10/2010 | Kirkpatrick et al. |
| 2013/0294771 | A1 | 11/2013 | McGlashan-Powell et al. |
| 2016/0112780 | A1 | 4/2016 | Zhang et al. |
| 2017/0339473 | A1 | 11/2017 | Swinkels et al. |
| 2019/0235929 | A1 | 8/2019 | Altstaetter et al. |

*Primary Examiner* — Sung H Pak

(74) *Attorney, Agent, or Firm* — Buchalter; Cecily Anne O'Regan

(57) ABSTRACT

Reconfigurable computing clusters, compute nodes within reconfigurable computing clusters, and methods of operating a reconfigurable computing cluster are disclosed. A reconfigurable computing cluster includes an optical circuit switch, and a plurality of computing assets, each of the plurality of computing assets connected to the optical circuit switch by two or more bidirectional fiber optic communications paths.

2 Claims, 8 Drawing Sheets

© 2017 Calient Technologies

© 2017 Calient Technologies

© 2017 Calient Technologies

© 2017 Calient Technologies

© 2017 Calient Technologies

© 2017 Calient Technologies

© 2017 Calient Technologies

© 2017 Calient Technologies

COMPUTE NODES WITHIN RECONFIGURABLE COMPUTING CLUSTERS

CROSS-REFERENCE

This application is a continuation application of application Ser. No. 16/351,931 filed Mar. 13, 2019, now U.S. Pat. No. 10,552,227, which is a continuation of Ser. No. 15/798,920, filed Oct. 31, 2017, which are incorporated herein by reference in their entirety, and to which application priority under 35 USC § 120 is claimed.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to cloud computing data center architecture and more particularly to reconfigurable compute nodes within a data center.

Description of Related Art

Cloud computing is an information processing architecture in which internal or external users access shared pools of reconfigurable computing resources such as servers, storage, applications, and services. With cloud computing, users run applications (which may be provided by the cloud provider or the user) on computing resources in the "cloud", which is to say on a remote server within a data center. The location and internal structure of the data center are unimportant, and typically unknown, to the user. Users benefit from access to scalable computing resources without having to make the investment in equipment and staff required to provide comparable in-house capabilities.

Cloud computing data centers include replicated computers that run applications for users. These computers will be referred to herein as "compute nodes," but may also be called "servers", "blades", "boards", or some other name. Currently, each compute node is a self-contained board or other physical module. Typically, multiple compute nodes are housed in a common equipment rack and connected to the world external to the rack though a high-speed network switch.

FIG. 1 is a simplified block diagram of an exemplary compute node 100. The compute node 100 is not necessarily representative of the compute nodes in any particular data center, but is illustrative of problems with the current data center architecture.

The exemplary compute node 100 includes two central processing units (CPUs) 110, 111 and eight graphics processing units (GPUs) 130 to 137. The compute node 100 may contain memory and other functional elements not shown in FIG. 1. The CPUs 110, 111 are communicatively coupled to each other, and the CPUs 110, 111 are coupled to respective interfaces 150, 151 to the external world. These interfaces may be or include, for example, high speed Ethernet interfaces for communications using the TCP/IP (transmission control protocol/internet protocol) protocol suite.

The GPUs 130-137 are organized as two banks of four GPUs respectively associated with the two processors 110, 111. Data transfers between the CPUs and GPUs are made over PCIE (peripheral computer interface express) buses. Since each CPU 110, 111 has limited PCIE bus capacity, respective PCIE switches 120, 121 are used between each CPU 110, 111 and the respective bank of GPUs. Although the PCIE bus provides high data transfer rates, significant latency may be incurred when data is transferred through one or both of the PCIE switches 120, 121.

A first problem with current data center architecture is inflexible compute node configuration. The compute node 100 is ideally suited to run applications that were designed for execution by two CPUs and eight GPUs. However, the fixed configuration (i.e. two CPUs and eight GPUs) of the compute node 100 makes it less suitable for other applications. For example, applications designed for more than eight GPUs would run slowly and inefficiently on the compute node 100. Applications designed for less than eight GPUs will run efficiently on the compute node 100, but are an inefficient use of the compute node's resources. The compute node 100 may have the capacity to run multiple applications concurrently, which may make more efficient use of the available resources. However, users commonly request applications to be run on dedicated (i.e. not concurrently shared with other users) compute nodes.

A second problem with current data center architecture is the aggregation of the functional elements of compute nodes into physical modules such that the development cycle of individual functional elements is tied together. This aggregation typically precludes upgrading one functional element of a compute node without replacing the entire module. Further, failure of any of the core elements (CPU, GPU, etc.) of an aggregate compute node requires replacement of the entire compute node.

An alternative to typical data center architecture is to have the core components (CPUs, GPUs and other application accelerators, storage, memory, etc.) of compute nodes disaggregated, or physically separated, and interconnected by a switching fabric. Disaggregation allows compute nodes of any desired configuration to be created by coupling the appropriate resources through the switching fabric. Further, disaggregation allows upgrading or replacing one type of core component without impacting other components. A high throughput, low latency switching fabric is a critical enabling technology for disaggregated data centers.

SUMMARY

An aspect of the disclosure is directed to reconfigurable computing clusters. Suitable reconfigurable computing clusters, comprise: an optical circuit switch; and a first plurality of computing assets, each of the first plurality of computing assets connected to the optical circuit switch by two or more bidirectional fiber optic communications paths.

Another aspect of the disclosure is directed to compute nodes within a reconfigurable computing cluster. Suitable compute notes within a reconfigurable computing cluster have a first plurality of computing assets, each of the first plurality of computing assets coupled to an optical circuit switch by two or more bidirectional fiber optic communications paths, the compute node comprising: a second plurality of computing assets taken from the first plurality of computing assets, each of the second plurality of computing assets connected to at least two other computing assets from the second plurality of computing assets via the respective fiber optic communications paths and the optical circuit switch.

Still another aspect of the disclosure is directed to methods for managing a reconfigurable computing cluster having a first plurality of computing assets, each of the first plurality of computing assets coupled to an optical circuit switch by two or more bidirectional fiber optic communications paths. Suitable methods comprise: receiving a request for a compute node; selecting, from the first plurality of computing assets, a second plurality of computing assets to implement the compute node; defining communications paths between the second plurality of computing assets to implement the compute node; the communication paths connecting each of the second plurality of computing assets to at least two other computing assets from the second plurality of computing assets; and configuring the optical circuit switch to provide the defined communications paths between the second plurality of computing assets.

DETAILED DESCRIPTION

Throughout this description, elements appearing in figures are assigned three-digit reference designators, where the most significant digit is the figure number where the element is introduced and the two least significant digits are specific to the element. An element that is not described in conjunction with a figure may be presumed to have the same characteristics and function as a previously-described element having the same reference designator.

Figure 2:
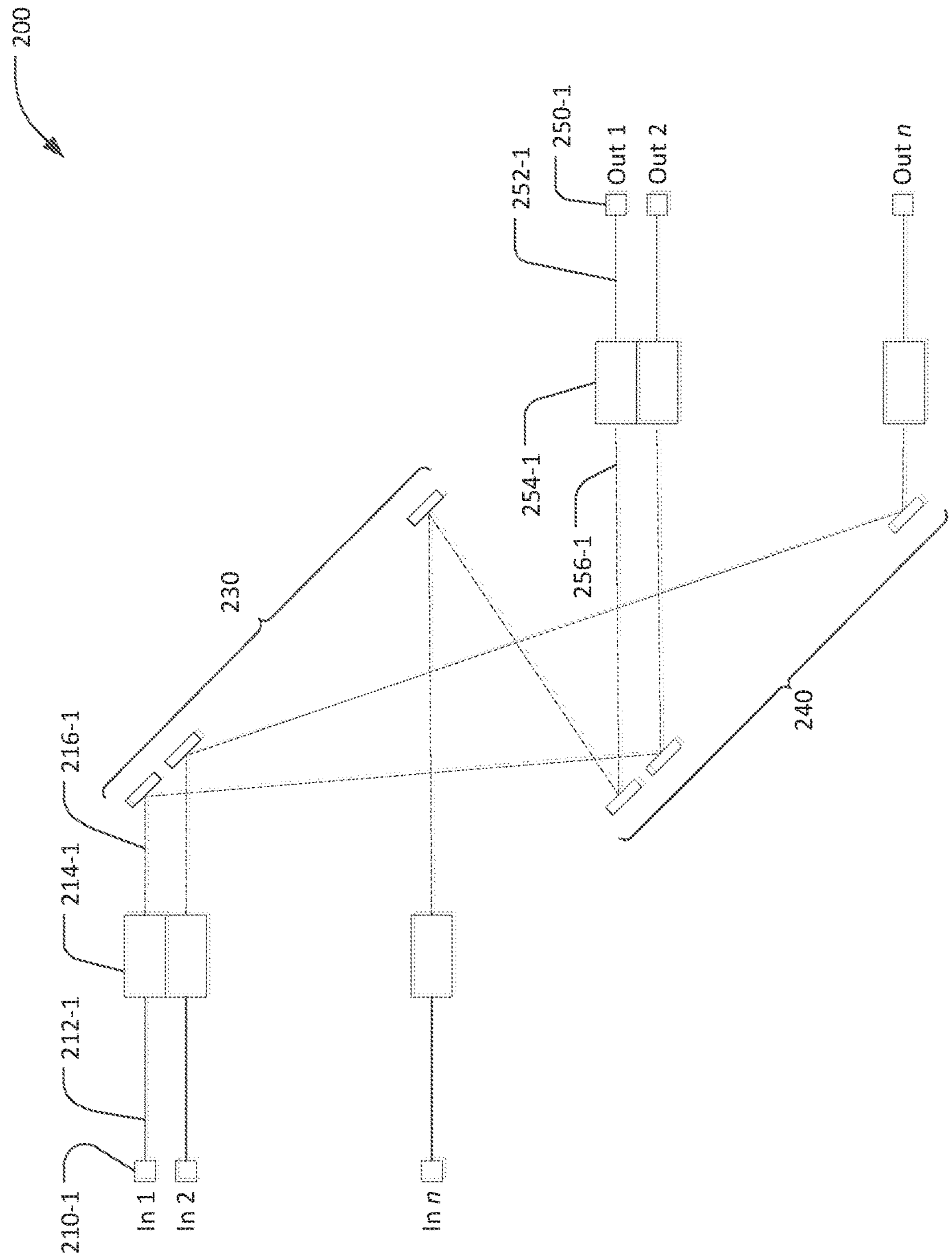
FIG. 2 is an optical schematic diagram of an optical circuit switch.

An optical circuit switch is a switching device that forms connections between pairs of fiber optic communications paths. Referring now to FIG. 2, an exemplary optical circuit switch 200 uses rotatable MEMS (micro electro-mechanical systems) mirrors to connect a group of n input ports (where n is an integer greater than 1), labeled In 1 to In n, to a group of n output ports, labeled Out 1 to Out n. More specifically, the optical circuit switch 200 may selectively connect up to n pairs of ports, where each pair of ports includes an input port and an output port. Other types of optical circuit switches may use switching technology other than rotatable mirrors.

In the optical circuit switch 200, each of the input ports In 1 to In n may be a connector (of which only the connector 210-1 is identified) to receive an input optical signal from a fiber optic cable (not shown) external to the optical circuit switch. Each connector may be coupled by a respective optical fiber (of which only optical fiber 212-1 is identified) to a respective collimator lens (of which only collimator lens 214-1 is identified). Each collimator lens may convert the input optical signal from the respective optical fiber into a collimated input optical beam (of which only input optical beam 216-1 is identified) in free space. Free space optical beams are shown in FIG. 2 as dashed lines.

Each input optical beam, such as input optical beam 216-1 may be directed onto a first mirror array 230. The first mirror array 230 may include n MEMS mirrors with a one-to-one correspondence between input optical beams and mirrors, such that each input optical beam is directed onto a respective mirror. Since each of the n input optical beams originates from a specific port and is directed onto a specific mirror, each port may be described as “uniquely associated” with a corresponding mirror. In this patent, “uniquely associated” means a one-to-one correspondence.

Each mirror on the first mirror array 230 may be rotated to reflect the respective input optical beam to a selected mirror of a second mirror array 240. The mirrors of the second mirror array may reflect the incident beam to form a respective output optical beam (of which only output optical beam 256-1 is identified). Each mirror in the second mirror array 240 is uniquely associated with a respective output port. The output optical beam may be directed to a corresponding focusing lens (of which only focusing lens 254-1 is identified). Each focusing lens may focus the respective output optical beam into an output optical signal in a respective optical fiber (of which only output optical fiber 252-1 is identified). The output optical signal may be conveyed to the respective output port connector (of which only connector 250-1 is identified).

The optical circuit switch 200 may create a one-to-one connection between each input port and any one of the output ports. For example, as shown in FIG. 2, Port In 1 is connected to port Out 2, port In 2 is connected to port Out n, and port In n is connected to port Out 1.

A typical optical circuit switch may have a plurality of ports and be capable of selectively connecting any port to any other port in pairs. Since an optical circuit switch does not convert information flowing over the fiber optic communication paths to electrical signals, the bandwidth of an optical circuit switch is essentially the same as the bandwidth of the optical communications paths. Further, an optical circuit switch is information agnostic, which is to say oblivious to, and not dependent upon, the data rate and protocols of the information flowing over the fiber optic communications paths. Connections through an optical circuit switch may use the same or different protocols and the same or different data rates. After the appropriate MEMS mirrors are rotated to establish a connection through an optical circuit switch, the optical circuit switch does not introduce any additional latency.

Figure 3:
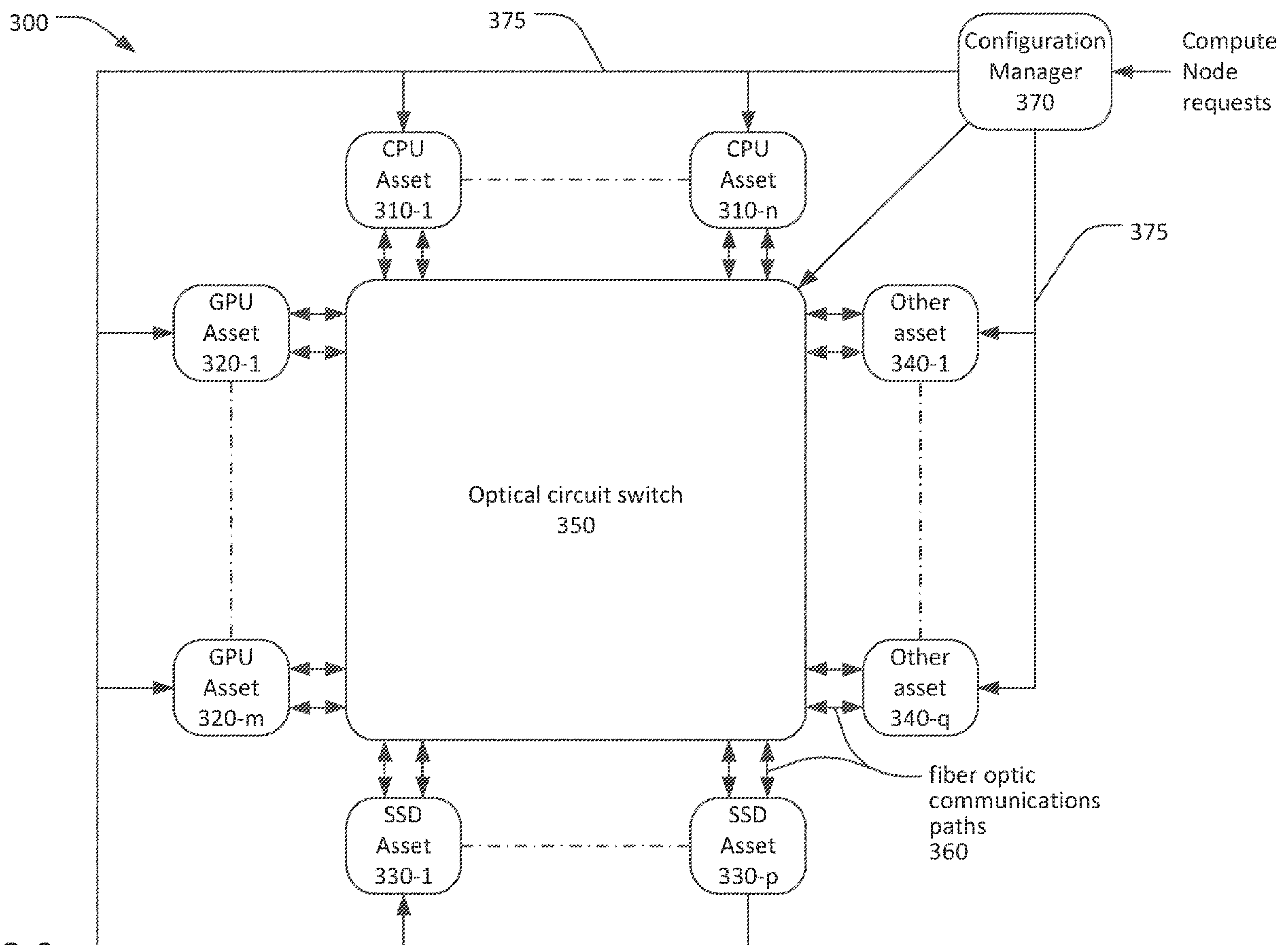
FIG. 3 is a block diagram of a disaggregated computing cluster incorporating an optical circuit switch.

FIG. 3 is a block diagram of a disaggregated computing cluster 300, which may be all or a portion of a cloud computing data center. The computing cluster 300 incorporates an optical circuit switch 350 to provide reconfigurable communications paths between a variety of computing assets. In this context, a “computing asset” is any of a variety of functional blocks that may be incorporated into a compute node. Each computing asset includes functional elements (i.e. elements that perform some function within a compute node) and interface elements to allow computing assets to communicate with each other via the optical circuit switch

350. The internal structure of computing assets will be described in more detail subsequently.

In the example of FIG. 3, the computing assets include n CPU assets (computing assets 310-1 to 310-*n*), m GPU assets (GPU asset 320-1 to 320-*m*), p solid state drive (SSD) assets (SSD asset 330-1 to 330-*p*) and q other assets (Other asset 340-1 to 340-*q*) where n, m, p, and q are positive integers. The other assets may be, for example, other types of application accelerator processors, other types of memory or storage, network interfaces, or other functional elements. FIG. 3 is exemplary, and the type and quantity of computing assets connected to an optical circuit switch may be determined by the needs of each data center. A computing cluster will typically include multiple CPU assets, but may not necessarily include all of GPU assets, SSD assets, or other assets.

There are at least two bidirectional fiber optic communications paths 360 between each of the computing assets 310-1 to 340-*q* and the optical circuit switch 350. Each bidirectional fiber optic communications path consists of two optical fibers, one of which is connected to an output port and the other of which is connected to an input port of the optical circuit switch 350. As will be discussed in subsequent examples, some or all of the computing assets may be connected to the optical circuit switch by more than two bidirectional fiber optic communications paths.

The number of computing assets in a computing cluster are limited by the number of ports on the optical circuit switch and the number of communications paths between the optical circuit switch and the computing assets. For example, the assignee of this patent currently makes an optical circuit switch capable of making connections between 320 input ports and 320 output ports. This optical circuit switch can interconnect 160 computing assets with two bidirectional fiber optic communications paths 360 between each of the computing assets and the optical circuit switch. Multiple optical circuit switches may be cascaded, for example as described in U.S. Pat. No. 9,207,404 issued Dec. 8, 2015 to Miglani et al. for Compound Optical Circuit Switch, to provide an optical switching fabric with a nearly unlimited number of ports.

The computing cluster 300 includes a configuration manager computing device 370. A "computing device" is a device having a processor and memory capable of executing stored instructions to perform some function. The configuration manager computing device 370 executes a configuration management program to manage the operation of the computing cluster 300. The configuration manager computing device 370 is coupled to the computing assets (CPU Asset 310-1 to 310-*n*, GPU Asset 320-1 to 320-*n*, SSD Asset 330-1 to 330-*n*, and Other Asset 340-1 to 340-*q*) via a configuration path 375. The configuration path 375 may be a serial or parallel bus, a local area network, or some other communications path that allows the configuration manager to provide configuration information to computing assets as those assets are assigned to particular compute nodes. The configuration manager computing device 370 is also coupled to the optical circuit switch 350. The configuration manager computing device 370 receives user requests for compute nodes, selects available computing assets, instructs the optical circuit switch 350 to establish the appropriate connections between the selected computing assets, and provides configuration information to the selected computing assets.

Any or all of the computing assets (CPU Asset 310-1 to 310-*n*, GPU Asset 320-1 to 320-*n*, SSD Asset 330-1 to 330-*n*, and Other Asset 340-1 to 340-*q*) in the computing cluster 300 may have additional interfaces to other elements not shown in FIG. 3. For example, some or all of the computing assets (CPU Asset 310-1 to 310-*n*, GPU Asset 320-1 to 320-*n*, SSD Asset 330-1 to 330-*n*, and Other Asset 340-1 to 340-*q*) may have Ethernet or other network interfaces to connect to a top-of-rack switch. Alternatively, or additionally, one or more of the Other Assets 340-1 to 340-*q* may be network interfaces.

Figure 4B:
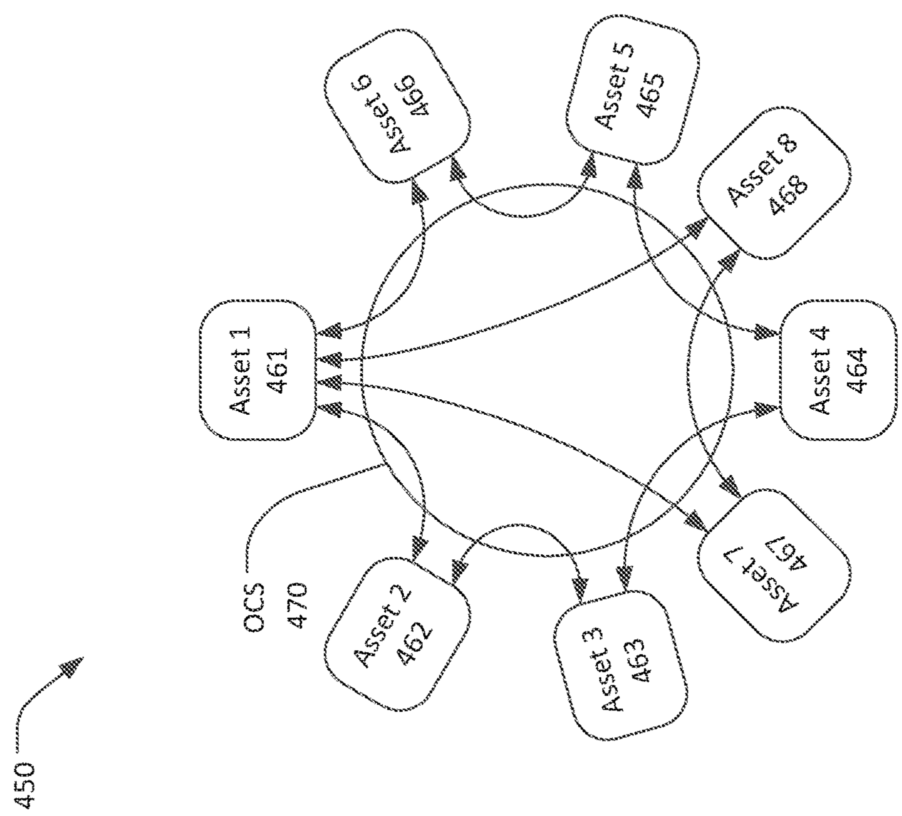
FIG. 4B is a block diagram of another compute node.
Figure 4A:
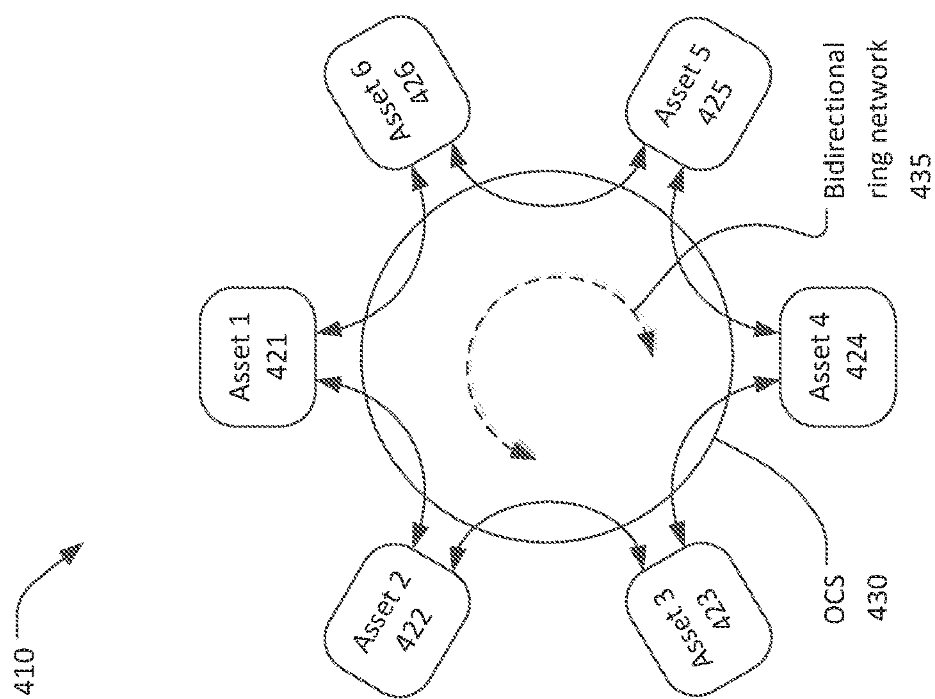
FIG. 4A is a block diagram of a compute node.

FIG. 4A is a block diagram of an exemplary compute node 410, which may be a portion of the computing cluster 300. In the compute node 410 six computing assets 421-426 (Asset 1 to Asset 6) are connected via an optical circuit switch 430 to form a bidirectional ring network 435. The inclusion of six assets in the compute node 410 is exemplary, and a compute node may include fewer or more than six assets. The type of computing assets and the order of the computing assets around the bidirectional ring network 435 is completely flexible. Preferably, computing assets that exchange a high volume of data are located in adjacent positions on the bidirectional ring network 435.

The bidirectional ring network 435 provides two communications paths (i.e. clockwise and counterclockwise) between any pair of computing assets. Communications between two computing assets that are not adjacent on the ring network are forwarded through intervening assets. For example, communications between Asset 1 421 and Asset 3 423 must pass through intervening Asset 2 422. Each intervening asset converts the received optical signal to electrical data, decides whether to forward the electrical data to functional elements within the asset or to convert the electrical data back to an optical signal to forward along the ring network. Thus, each intervening asset will introduce some latency. The latency can be minimized (potentially to as little as a few nanoseconds) if the protocols used for data transfer in the ring network allow each intervening asset to make a nearly instantaneous decision whether or not to forward received data. These protocols will be discussed subsequently. The number of computing assets included in a ring network may be limited by the maximum allowable latency for communications between computing assets.

Having more than two fiber optic communications paths between some or all of the computing assets and the optical circuit switch allows greater flexibility in compute node architecture, at the expense of reducing the total number of computing assets that may be connected to a given optical circuit switch. FIG. 4B is a block diagram of another compute node 450 which may be a portion of the computing cluster 300. In the compute node 450, eight computing assets 461-468 (Asset 1 to Asset 6) are connected via an optical circuit switch 470. The inclusion of eight computing assets in the compute node 410 is exemplary, and a compute node may include fewer or more than eight computing assets.

In contrast to the compute node 410 of FIG. 4A, there are four bidirectional fiber optic communications paths between computing asset 461 and the optical circuit switch 470. In this example, Asset 1 to Asset 6 (461-466) are interconnected to form a first bidirectional ring network similar to the bidirectional ring network 435 of FIG. 4A. Asset 1, Asset 7, and Asset 8 (461, 467, 468) are interconnected to form a second bidirectional ring network independent of the first bidirectional ring network.

Figure 1:
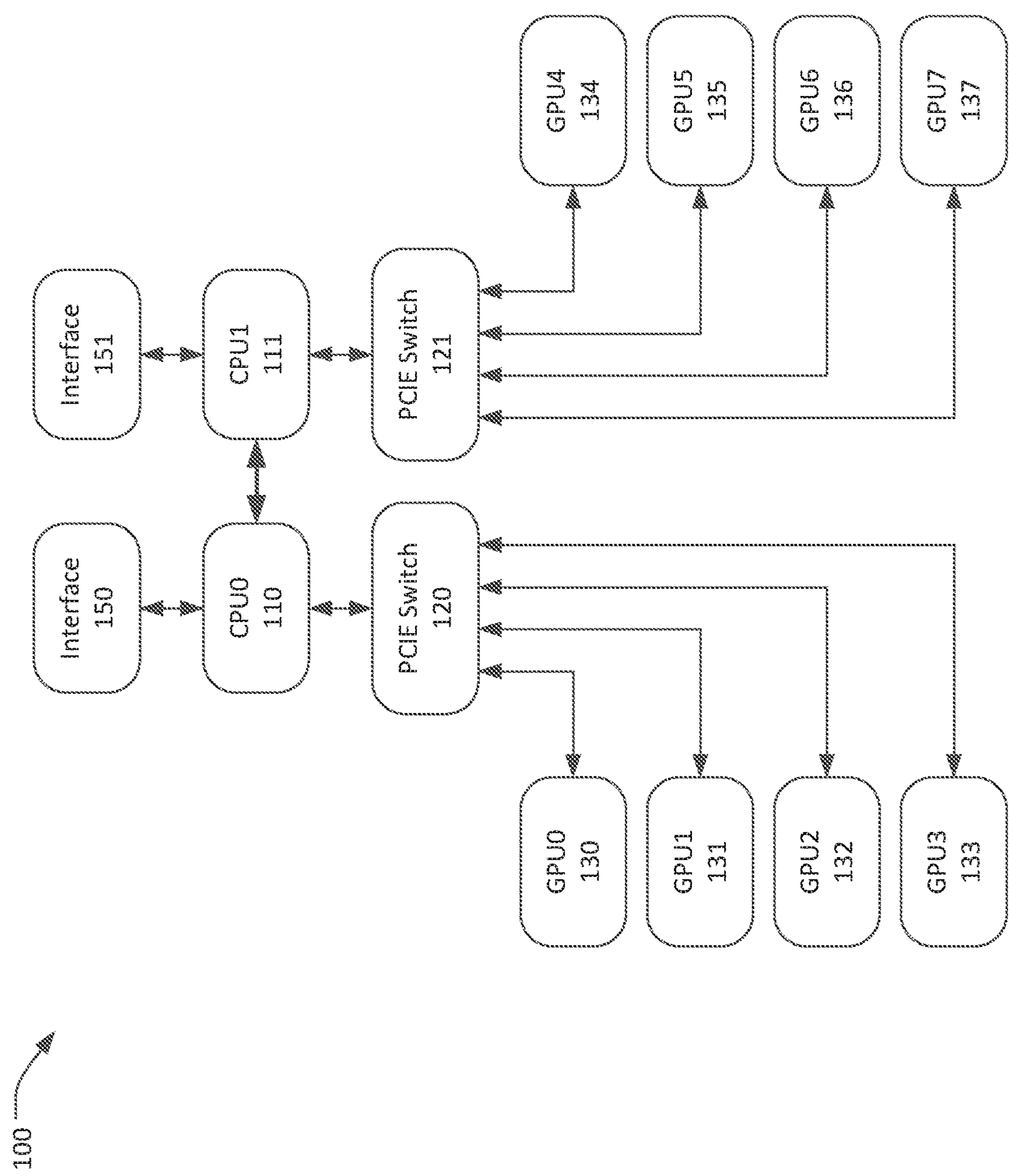
FIG. 1 is block diagram of an exemplary conventional compute node.
Figure 5:
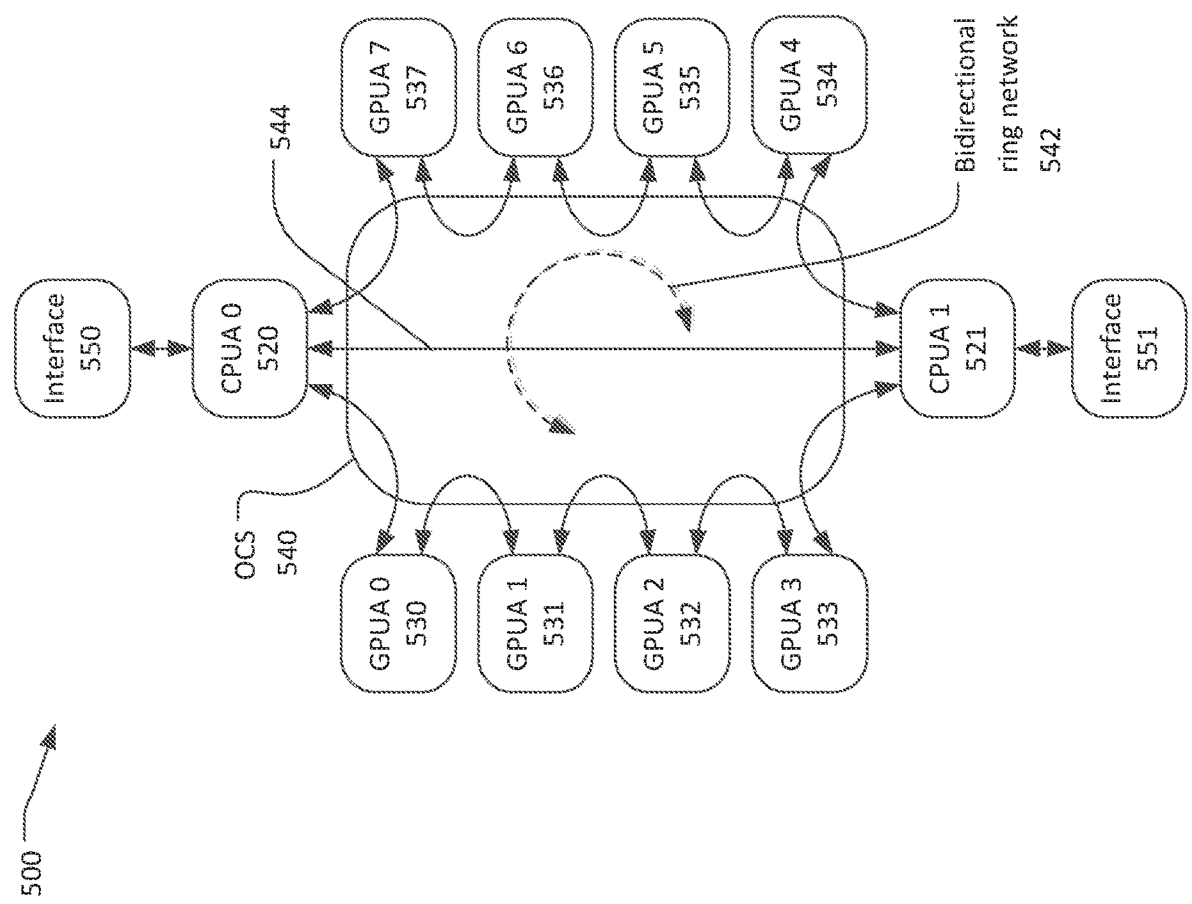
FIG. 5 is a block diagram of another compute node.

FIG. 5 is a block diagram of a compute node 500 having the same complement of processors as the compute node 100 of FIG. 1. The exemplary compute node 500 includes two central processing unit assets (CPUAs) 520, 521 and eight graphics processing unit assets (GPUAs) 530 to 537. The CPUAs 520, 521 each have three fiber optic communications paths to an optical circuit switch (OCS) 540. The CPUAs 520, 521 are coupled to respective interfaces 550, 551 to the external world. These interfaces may be, or include, for example, high speed Ethernet interfaces for communications using the TCP/IP (transmission control protocol/internet protocol) protocol suite.

The eight GPUAs 530-537 each have two fiber communications paths to the optical circuit switch 540. The optical circuit switch 540 is configured to connect the two CPUAs and eight GPUAs with a bidirectional ring network 542. A direct connection 544 is also provided between the two CPUAs 520, 521 using the third communications path from each CPUA to the optical circuit switch 540.

Figure 6:
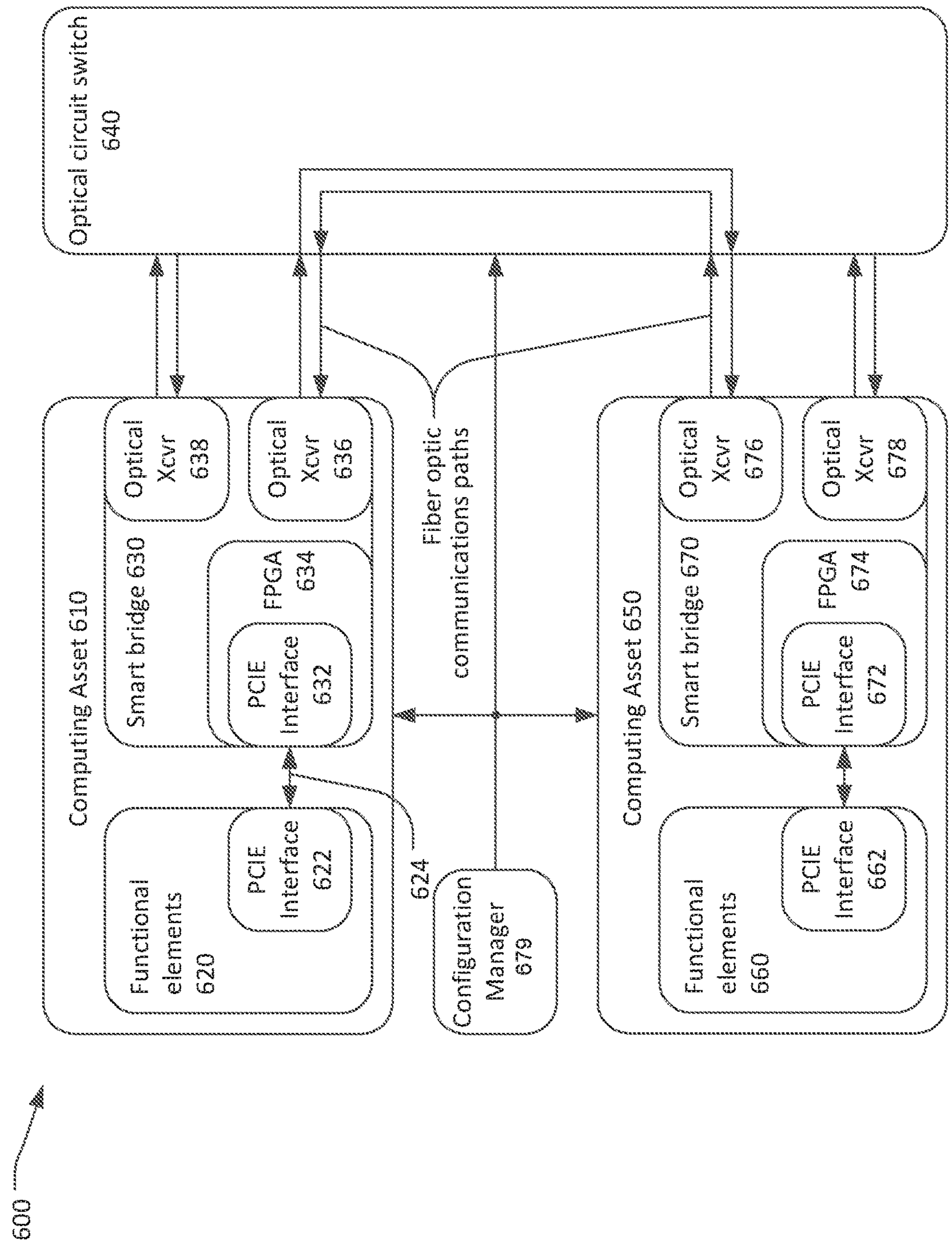
FIG. 6 is a block diagram of two computing assets connected through an optical circuit switch.

FIG. 6 is a block diagram of a portion of a compute node 600 including a first computing asset 610 and a second computing asset 650 connected via a bidirectional optical communications path through an optical circuit switch 640. The two computing assets 610, 650 and the optical circuit switch 640 may be a portion of a compute node such as the compute nodes 410, 450, and 500. The two computing assets 610, 650 may be, for example adjacent assets on a bidirectional ring network, such as the computing assets 421, 422 in the compute node 410.

The first computing asset 610 includes functional elements 620 and a smart bridge 630. The functional elements 620 include a PCIE interface 622 and other components, firmware, and software required to perform the functions of the computing asset 610. For example, if computing asset 610 is a CPUA, the functional elements 620 may include a processor chip or chip set, a PCIE root controller, memory, and other components as needed to perform the functions of a CPU. The smart bridge 630 provides a bridge or interface between the functional assets and the bidirectional fiber optic communications paths connecting the first computing asset 610 to the optical circuit switch 640.

The functional elements 620 are coupled to the smart bridge 630 via an internal multi-lane PCIE bus 624. For example, the functional elements 620 may be coupled to the smart bridge 630 by four, eight, or sixteen PCIE lanes having data rates up to 8 GT/s (Giga-transfers/sec) per lane.

The smart bridge 630 includes a field programmable gate array (FPGA) 634 that incorporates a PCIE interface 632. The smart bridge 630 also includes, or is coupled to, two or more optical transceivers 636, 638 for connection to the optical circuit switch 640 via a corresponding number of bidirectional fiber optic communications paths. For example, the smart bridge 630 may include one or more sockets for plug-in optical transceivers, each of which provides an interface for one or more bidirectional fiber optic communications paths. A wide variety of plug-in optical transceivers are available for use at 636 and 638. For example, available 100 gigabit Ethernet plug-in optical transceivers are capable of communications at rates up to 100 Gb/s over a single fiber optic communications path using wavelength division multiplexing, or at 25 Gb/s over four parallel fiber optic communications paths. An optical transceiver intended for 100 Gb/s Ethernet can be used with other protocols at similar data rates.

The second computing asset 650 is composed of similar elements including functional elements 660 having a PCIE interface 662 and a smart bridge 670 having an FPGA 674 with a PCIE interface 672 and two or more optical transceivers 676, 678.

A typical function of a smart bridge is to convert data between a multi-lane PCIE bus and standard network communications protocols used for communications over fiber optic communications paths. In some applications, a smart bridge may perform additional in-line functions such a packet inspection and/or encryption. Standard protocols, such as TCP/IP/Ethernet, allow the transfer of data generated by any application between two or more devices within a vast address space. However, each communications packet must be processed through a layered protocol stack that introduces significant (microseconds) latency. This latency makes standard protocols unsuitable for use within a compute node.

In the compute node 600, the objective of the smart bridges 630, 670 is to transfer data in PCIE format between the functional elements 620, 660 in the first and second computing assets 610, 650. The data transfer is "transparent" to the functional elements if the communications between the first and second computing assets 610, 650 occur, to the extent possible, as if the PCIE interfaces 622, 662 were directly coupled at the physical layer (i.e. as if the multi-lane PCIE bus 624 extended between the two PCIE interfaces 622, 662).

To send data via a fiber optic communications path, the smart bridges 630, 670 serialize data received via the respective multi-lane PCIE bus and encapsulate the serialized data with a minimal native link protocol that synchronizes transmission and reception of data packets, manages addressing within the limited address space of a compute node, and provides error detection (e.g. a cyclic redundancy code) and/or forward error correction. To receive data via a fiber optic communications path, the smart bridges 630, 670 extract the encapsulated data, check and/or correct transmission errors, and de-serialize the data for transfer to the respective functional elements via the respective multi-lane PCIE bus.

The native link protocol may be unique to a computing cluster (such as the computing cluster 300) or to each compute node, such as the compute node 600, within a computing cluster. The native link protocol used within compute node 600 need not be understood anywhere outside of the compute node 600. Since an optical circuit switch is protocol and data rate agnostic, different compute nodes implemented within the same computing cluster may use the same or different native link protocols and/or data rates. Further, communications between pairs of assets within the same compute node may use the same or different native link protocols and/or data rates. The native link protocol or protocols used within a computing cluster may be enabled by a configuration manager 679 as part of configuring the computing assets 610, 650, the optical circuit switch 640, and other elements (not shown) of the compute node 600.

Figure 7:
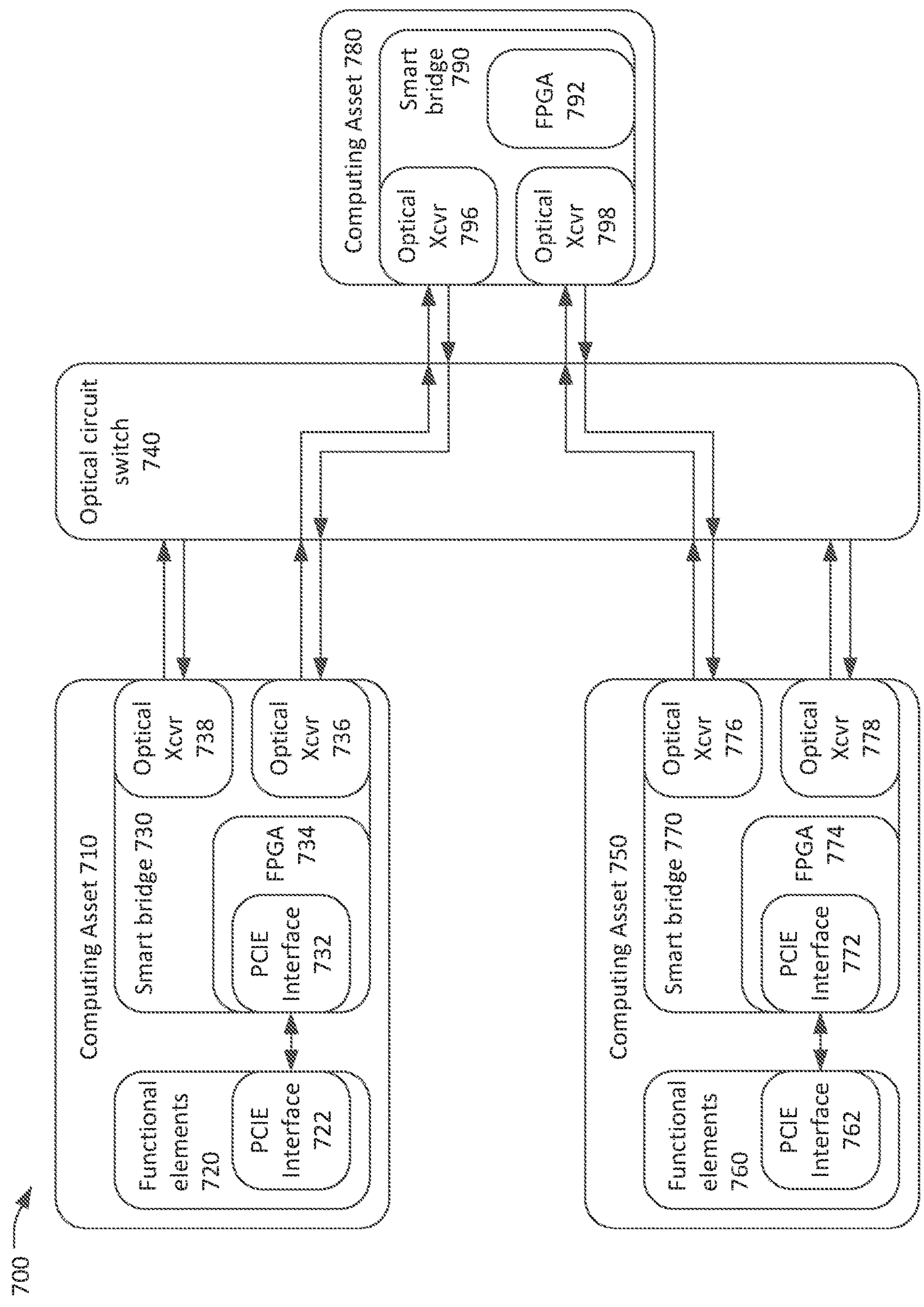
FIG. 7 is a block diagram of two computing assets connected through an optical circuit switch and an intervening computing asset.

FIG. 7 is a block diagram of a portion of a compute node 700 including a first computing asset 710 and a second computing asset 750 connected via an optical circuit switch 740 and a third computing asset 780. The three computing assets 710, 750, 780 and the optical circuit switch 740 may be a portion of a compute node such as the compute nodes 410, 450, and 500. The two computing assets 710, 750 may be, for example non-adjacent assets on a bidirectional ring network, such as the computing assets 421, 423 in the compute node 410, which communicate through computing asset 422.

The structure and operation of the first and second computing assets 710 and 750 is the same as described for the computing assets 610 and 650 in FIG. 6. The description of these elements will not be repeated.

The third computing asset 780 also includes a smart bridge 790 including an FPGA 792 and two optical transceivers 796, 798. The third computing asset 780 presumably also includes functional elements not shown in FIG. 7. The third computing asset 780 intercepts and forwards communications between the first and second computing assets 710, 750. For example, data transmitted optically from the first computing asset 710 is received at the optical transceiver 796 and converted into electrical signals. These signals are processed by the FPGA 792 only to the extent necessary to determine that the data should be forwarded. The native link protocol used for communications within the compute node 700 may be designed specifically to minimize latency as data is forwarded. The data is then reconverted and transmitted optically by the optical transceiver 798. The smart bridge 790 within the third computing asset 780 may forward data between the first and second computing asset 710, 750 without converting the data into PCIE format and without providing the data to functional elements within the third computing asset.

Description of Processes

Figure 8:
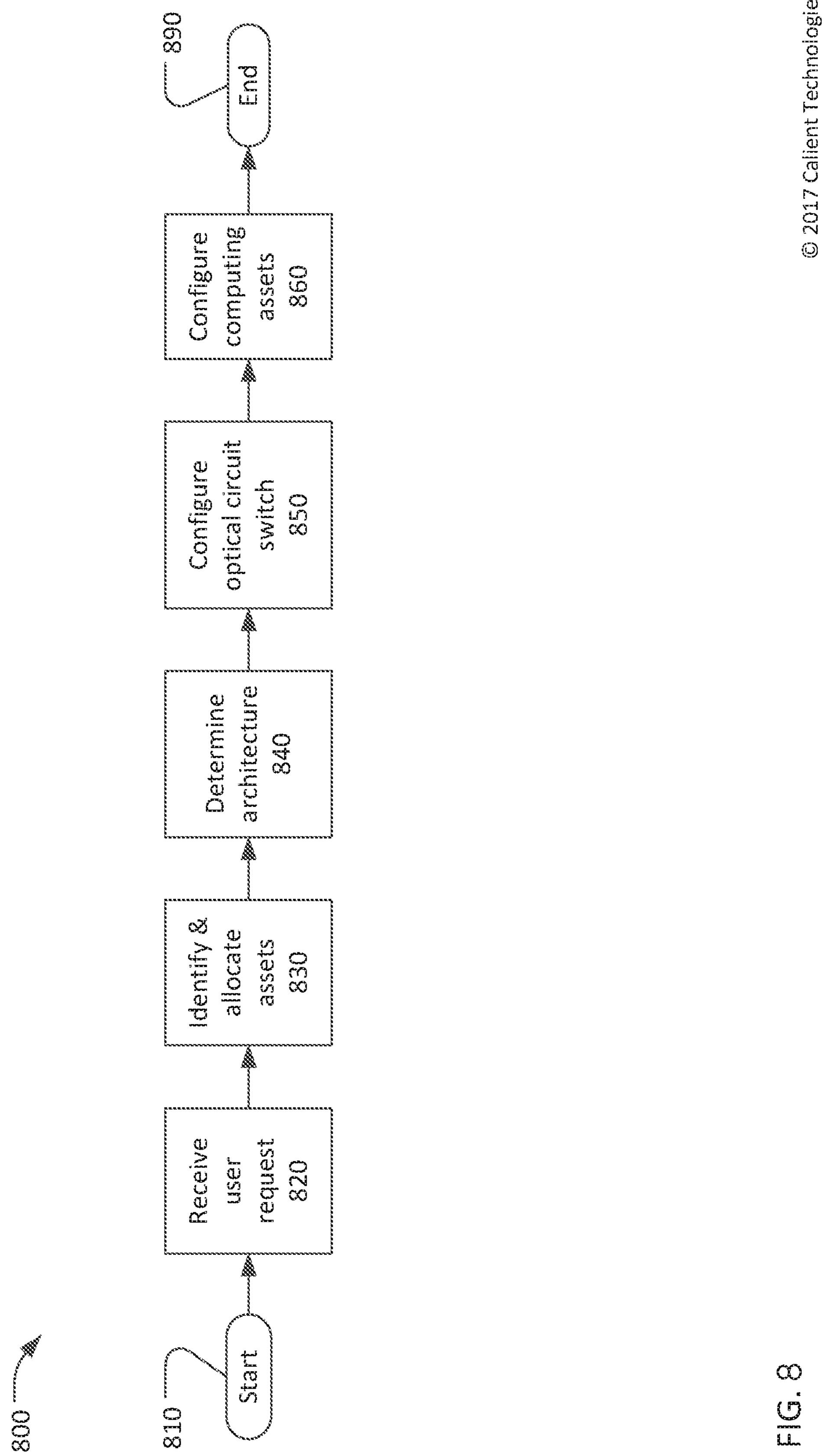
FIG. 8 is a flow chart of a process for configuring a compute node.

Referring now to FIG. 8, a process 800 to configure a compute node within a data center starts at 810 and ends at 890. The process 800 may be executed by a configuration manager computing device, such as the configuration manager computing device 370 of FIG. 3, within a cloud computing data center. Since a data center may operate many compute nodes concurrently, multiple instantiations of the process 800 may run concurrently on the same or multiple configuration managers.

The process 800 is initiated when the configuration manager receives, at 820, a user request for a compute node. The user may request a compute node having a specified combination of computing assets. Alternatively, the user may request a compute node for execution of a specified application (which may be provided by the user or by the data center), where the computing assets required to run the specified application are known to the configuration manager.

In either case, at 830, the configuration manager identifies available computing assets for use in the requested compute node. For example, the configuration manager may maintain a list of available computing assets (or a list of all computing assets with a flag indicating whether or not each asset is available) and simply select the required complement of computing assets from the list. The selected computing assets are then removed from the list of available assets and allocated to the requested compute node.

At 840, the architecture of the compute node, including the arrangement of communications paths between the computing assets within the compute node, is determined. In the simplest case, where every computing asset is connected to an optical circuit switch by two bidirectional communication paths, the architecture may be a bidirectional ring network as shown in FIG. 4A. When some or all of the computing assets are connected to the optical circuit switch by more than two communications paths, more complex architectures are possible, as shown in FIG. 4B and FIG. 5. In all cases, the architecture of the compute node should be determined such that computing assets having the highest inter-asset traffic are directly connected or connected though the smallest number of intermediate computing assets, to the extent possible. Determining the architecture at 840 may also include defining native protocols to be used for communications between the computing assets.

The optical circuit switch is configured at 850. To this end, the compute node sends commands to the optical circuit switch to set the appropriate mirrors such that the communications paths defined at 840 are physically realized. The computing assets are configured at 860 by uploading software as needed for the computing assets to expected functions in the requested compute node. This uploaded software may include programming code to program FPGAs within the computing assets. This programming code may, for example, be configured the FPGAs to execute the communications protocol(s) defined at 840. Configuring the optical circuit switch at 860 and configuring the computing assets at 860 may be done in either order or concurrently. Once the optical circuit switch and computing assets have been configured, the compute node is ready for use by the requestor and the process 800 ends at 890.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or forder of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

What is claimed is:

1. A compute node within a reconfigurable computing cluster having a first plurality of computing assets, each of the first plurality of computing assets coupled to an optical circuit switch by two or more bidirectional fiber optic communications paths, the compute node comprising:

a second plurality of computing assets comprising functional elements taken from the first plurality of computing assets, each of the second plurality of computing assets connected to at least two other computing assets from the second plurality of computing assets via the respective fiber optic communications paths and the optical circuit switch; and a smart network interface card coupled to the functional elements via a multi-lane PCIE (peripheral component interconnect express) bus, wherein the smart bridge within the second plurality of computing assets is configured to transparently extend the multi-lane PCIE bus between connected pairs of computing assets via the fiber optic communications paths and the optical circuit switch.

2. The reconfigurable computing cluster of claim 1, wherein the smart network interface card within the second plurality of computing assets implements a native link protocol for communicating between connected pairs computing assets via the respective fiber optic communications paths and the optical circuit switch.

* * * * *